United States Patent [19]

England

[11] Patent Number: 5,027,714
[45] Date of Patent: Jul. 2, 1991

[54] VEHICULAR CONVEYOR FOR CAR WASH

[75] Inventor: Donald W. England, Iowa Falls, Iowa

[73] Assignee: Lucian G. McElroy, Metamora, Mich.; a part interest

[21] Appl. No.: 367,457

[22] Filed: Jun. 16, 1989

[51] Int. Cl.$^5$ .............................................. B65G 35/00
[52] U.S. Cl. ..................................... 104/162; 74/128; 198/630
[58] Field of Search ............................ 104/162, 172.3; 198/630; 74/128, 149

[56] References Cited

U.S. PATENT DOCUMENTS

| | | | |
|---|---|---|---|
| 605,621 | 6/1898 | Acklin . | |
| 2,115,762 | 5/1938 | Bohn | 198/21 |
| 2,336,614 | 12/1943 | Jackson | 198/20 |
| 2,595,006 | 4/1952 | Sheperdson | 34/105 |
| 3,128,721 | 4/1964 | McGowen | 104/162 |
| 3,155,218 | 11/1964 | Creed | 198/30 |
| 3,200,966 | 8/1965 | Peterson et al. | 214/1 |
| 3,548,997 | 12/1970 | Buchhelt | 198/24 |
| 3,665,987 | 5/1972 | Daugherty | 146/811 R |
| 3,785,295 | 1/1974 | Kiukkonen | 198/630 |
| 3,785,477 | 1/1974 | Kwasnitschka | 198/218 |
| 3,848,541 | 11/1974 | Hondzinski | 198/630 |
| 4,039,075 | 8/1977 | Gray | 198/746 |
| 4,342,387 | 8/1982 | Gray | 198/746 |
| 4,462,519 | 7/1984 | Parkell et al. | 198/490 |
| 4,662,284 | 5/1987 | Belanger et al. | 104/172.3 |

FOREIGN PATENT DOCUMENTS 2339587 2/1975 Fed. Rep. of Germany ...... 104/162

*Primary Examiner*—Joseph F. Peters, Jr.
*Assistant Examiner*—Virna Lissi Mojica
*Attorney, Agent, or Firm*—Reising, Ethington, Barnard, Perry & Milton

[57] ABSTRACT

A vehicular conveying apparatus (10) for use in a car wash includes a plurality of plate-like pushers (20) individually mounted for pivotal movement to engage the rear of a wheel (12) and push in an upward and forward direction to urge the wheel (12) to roll downstream along a predetermined path (18). Four parallel shafts (56) are supported for linear movement underneath the pushers (20). Catches (42) are disposed on each of the shafts (56) for engaging and moving the pushers (20). On the bottom of each pusher (20), a spring-biased coupler (40) is pivotally attached for movement toward and away from an associated catch (42). An actuator (38) is attached to the bottom of each of the pushers (20) for moving the coupler (40) of the next adjacent upstream pusher (20) toward its associated catch (42). Thus, when a wheel (12) engages one pusher (20), the next adjacent upstream pusher (20) causes the wheel (12) to roll into engagement with another pusher (20). As the wheel (12) continues to roll, each pusher (20) is sequentially actuated in like manner to smoothly roll the wheel (12) between the ends (18A,18B) of the conveyor (10).

72 Claims, 8 Drawing Sheets

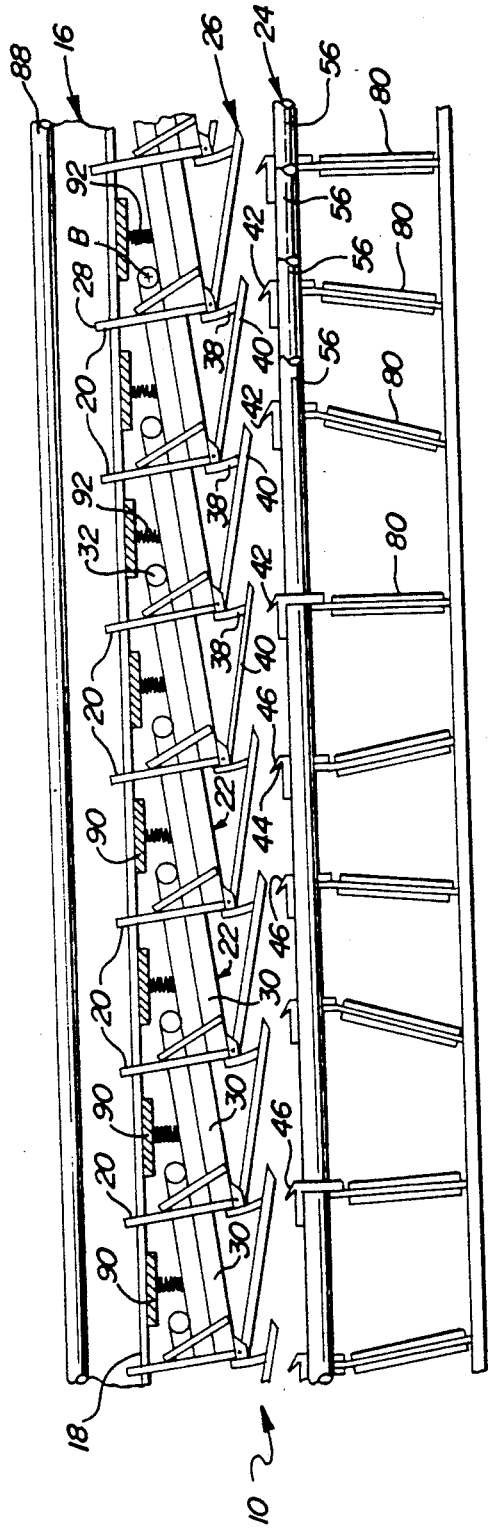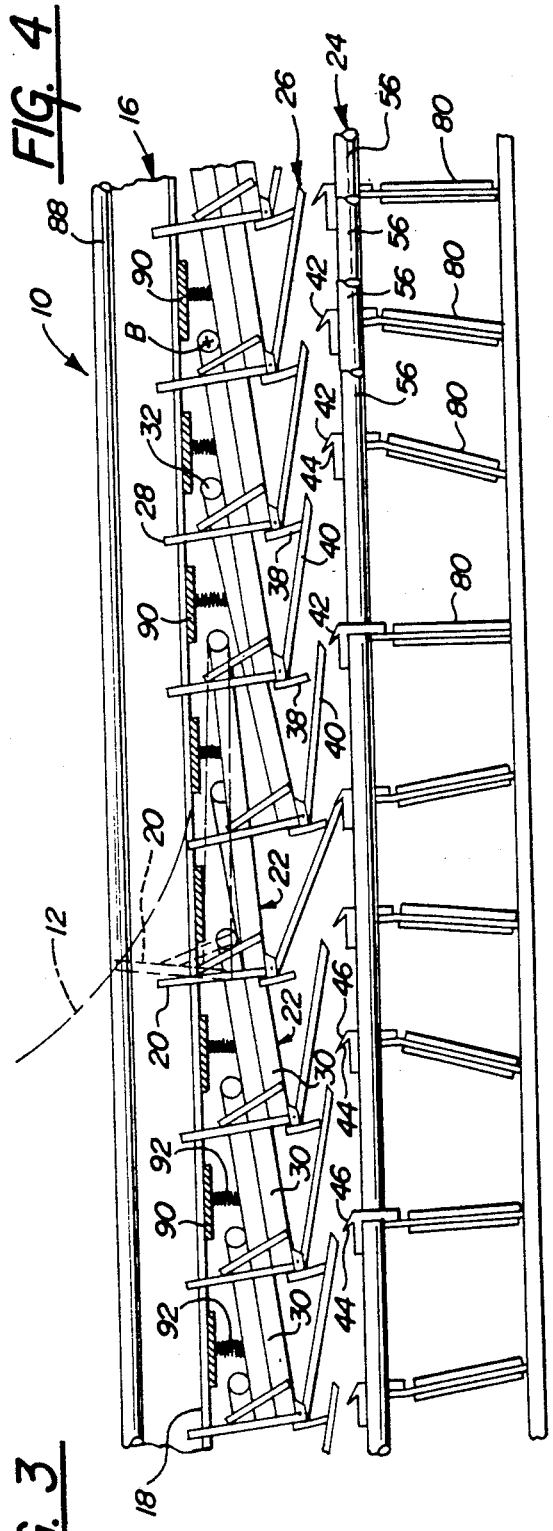

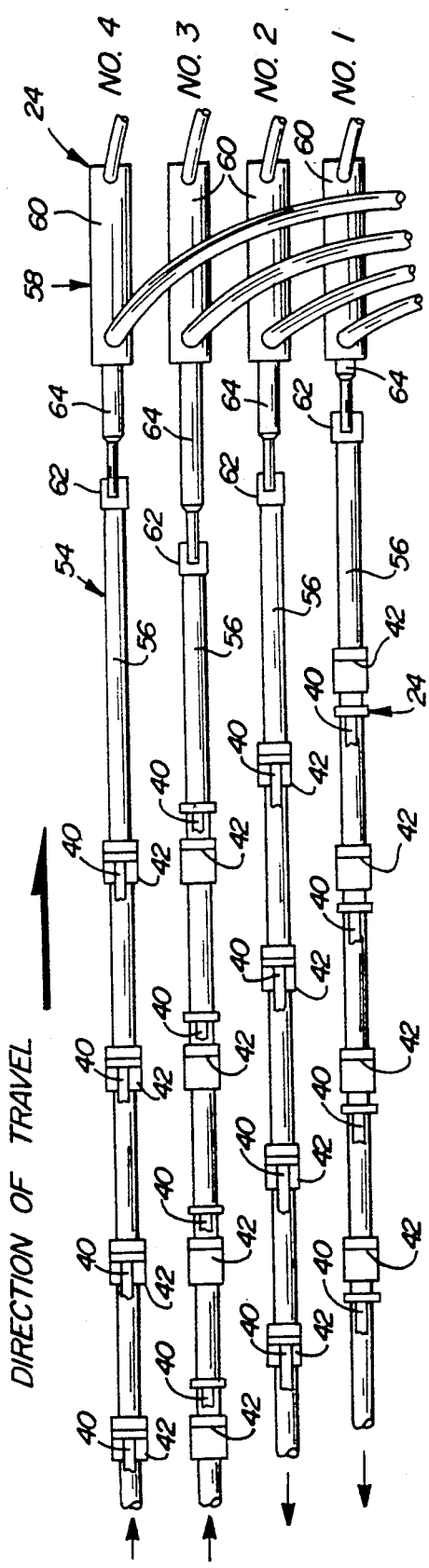
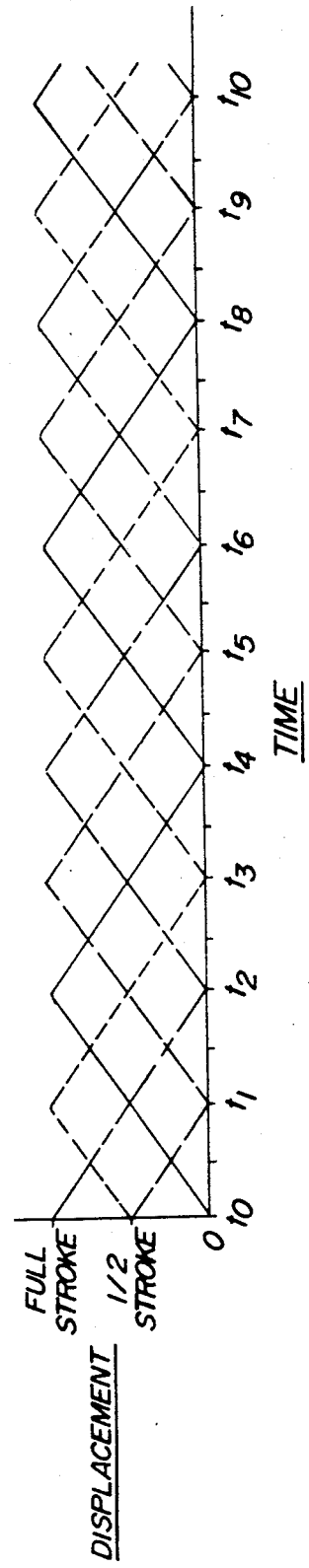

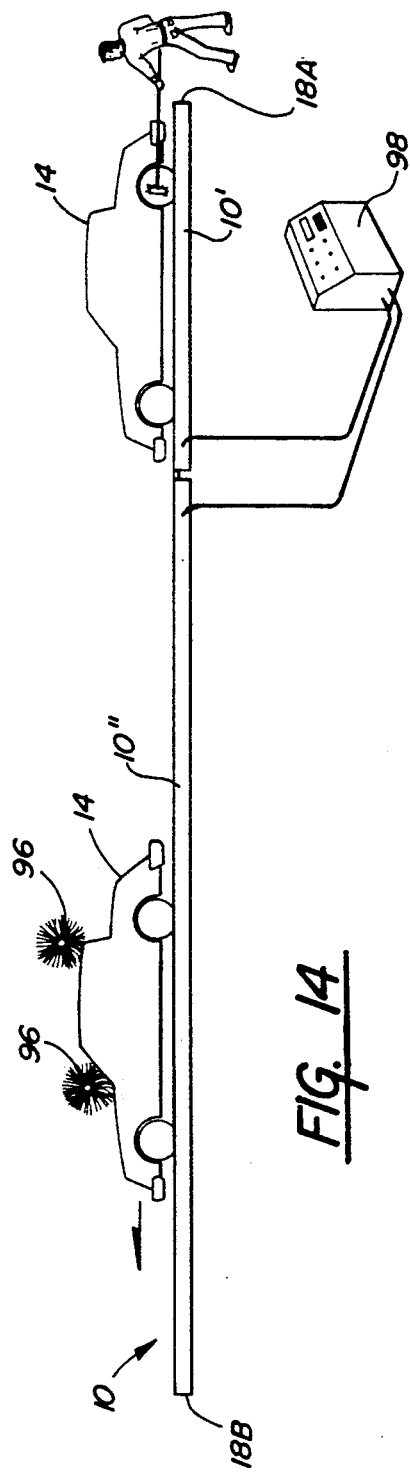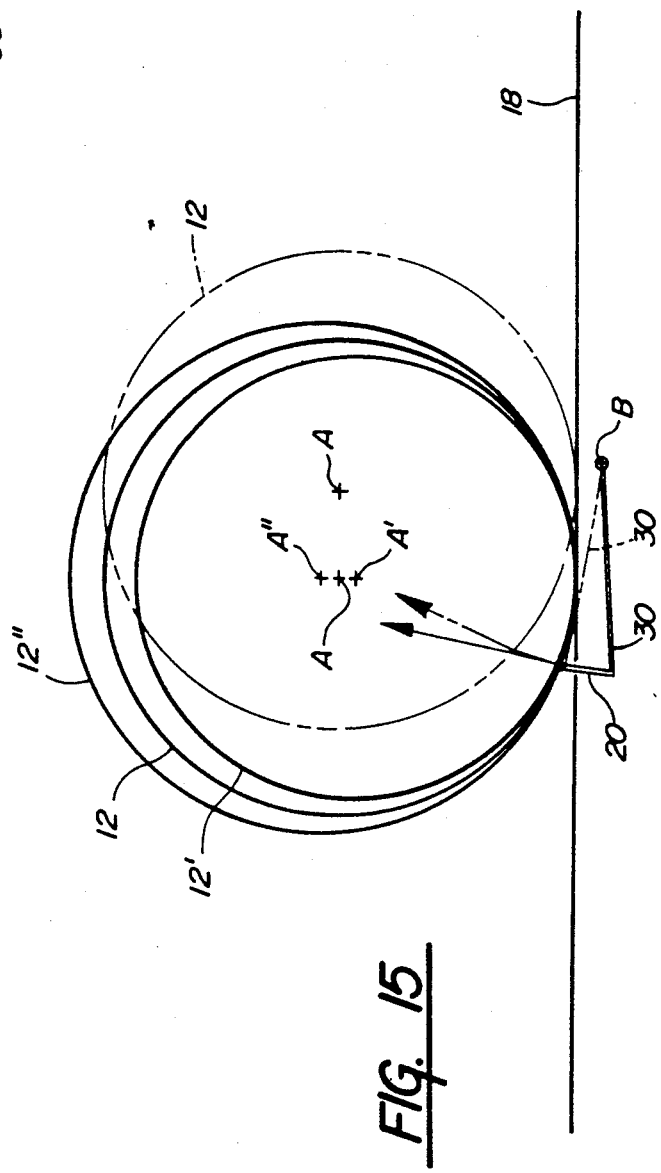
FIG. 14
FIG. 15

VEHICULAR CONVEYOR FOR CAR WASH

FIELD OF THE INVENTION

The subject invention relates generally to an apparatus for pushing articles over a separate load-support surface and having a plurality of reciprocating pushers oscillating about axes below the load-support surface. More particularly, the invention relates to a vehicular conveying apparatus for rolling a wheel along a linear path by applying a force upwardly and forwardly against the rear of the wheel to urge the wheel to roll along the path.

BACKGROUND ART

Vehicular conveying apparatuses for moving a vehicle through a washing facility generally comprise a long continuous chain extending the length of the conveyor path. Wheel-engaging elements are fixed to the chain at spaced intervals for engaging the rear of the wheel and moving the wheel with the chain. Such prior art conveyors are particularly deficient in that a majority of the energy required to operate the conveyor is expended in moving the chain alone, i.e., absent a vehicle. Additionally, a moving chain is hazardous to nearby workers in that a foot, hand, or portion of clothing may easily be caught in the moving chain, causing severe injury. Further, such conveyors are known to be very difficult and costly to maintain in proper and safe working order.

SUMMARY OF INVENTION AND ADVANTAGES

The subject invention contemplates a vehicular conveying apparatus of the type for rolling a wheel along a linear path. The apparatus comprises a guide means for guiding the wheel along a longitudinally extending path, a plurality of pushers spaced longitudinally along the path and individually movable between a rest position and a actuated position for urging the wheel to roll along the path, and drive means having an engaged condition operatively connected to the pushers for sequentially driving the pushers from the rest position to the actuated position. The invention is characterized by the drive means including a clutch means for disengaging the drive means from each of the pushers to maintain the pushers in their respective rest positions and for individually engaging each of the pushers with the drive means in response to the wheel being disposed in engagement with an adjacent pusher.

The subject invention also contemplates a vehicular conveying apparatus as described above and characterized by each of the pushers including a support means for arcuately moving each pusher from its respective rest position to its actuated position to direct the force into the wheel at an angle spaced between the wheel axis and the circumference of the wheel and for continuously redirecting the force at an angle spaced between the wheel axis and the circumference of the wheel as the wheel moves along the path.

Additionally, the subject invention contemplates a vehicular conveying apparatus as described above and characterized by the drive means individually and sequentially driving the pushers from the rest position to the actuated position in response to the presence of a wheel adjacent thereto to receive the force from the pusher as it is moved from the rest position to the actuated position.

Further, the subject invention contemplates a vehicular conveying apparatus characterized by the apparatus including a first conveyor portion adjacent an upstream end of the path and a second conveyor portion adjacent a downstream end of the path and operated independently of the first portion.

And again, the subject invention contemplates a vehicular conveying apparatus as above and characterized by the drive means sequentially moving the pushers toward an actuated position in a longitudinally propagating continuous wave behind the wheel to smoothly roll the wheel along the path.

Also, the subject invention contemplates a method for rolling a wheel along a predetermined path. The method comprises the steps of guiding the wheel for rolling movement along a predetermined path, sequentially moving one of a plurality of pushers between a rest position and an actuated position, and applying a force upwardly and forwardly against the rear of the wheel from each of the pushers to urge the wheel to roll along the path. The method is characterized by maintaining each of the pushers in their respective rest positions and for individually moving each pusher toward the actuated position in response to the wheel being disposed in engagement with an adjacent pusher.

Further, the subject invention contemplates a method for rolling a wheel along a predetermined path as described above and characterized by rotating each of the pushers into the wheel about respective axes disposed in a horizontal plane below and extending transversely to the path.

The invention also contemplates a method for rolling a wheel along a predetermined path as described above, and characterized by individually and sequentially driving the pushers from the rest position to the actuated position in response to the presence of a wheel adjacent thereto to receive the force from each pusher as it is moved from the rest position to the actuated position.

Further, the subject invention contemplates a method for rolling a wheel along a predetermined path, and characterized by sequentially moving the pushers toward the actuated position in a longitudinally propagating continuous wave behind the wheel to smoothly roll the wheel along the path.

FIGURES IN THE DRAWINGS

Other advantages of the present invention will be readily appreciated as the same becomes better understood by reference to the following detailed description when considered in connection with the accompanying drawings wherein:

FIG. 3 is a cross-sectional view of a portion of the conveyor according to the subject invention;

FIG. 4 is a cross-sectional view as in FIG. 3 showing the clutch means operatively connecting one pusher and the drive means;

FIG. 5 is a top view of a portion of the drive means according to the subject invention;

FIG. 8 is a displacement diagram of the drive means;

FIG. 14 is a schematic view of the subject invention showing the first conveyor portion and the second conveyor portion; and FIG. 15 is a diagrammatic view of a wheel disposed for movement on the subject conveyor with the direction of force applied to the wheel by a pusher illustrated.

DETAILED DESCRIPTION OF THE PREFERRED EMBODIMENT

Referring to the FIGURES, wherein like numerals indicate like or corresponding parts throughout the several views, a vehicular conveying apparatus is generally shown at 10. The apparatus 10 is of the type for rolling a wheel 12 along a linear path. The wheel 12 is supported on an axis of rotation A by an associated vehicle 14. The apparatus 10 is particularly well-suited for conveying the vehicle 14 through a washing facility wherein the exterior surface of the vehicle 14 is washed and dried.

Figure 1:
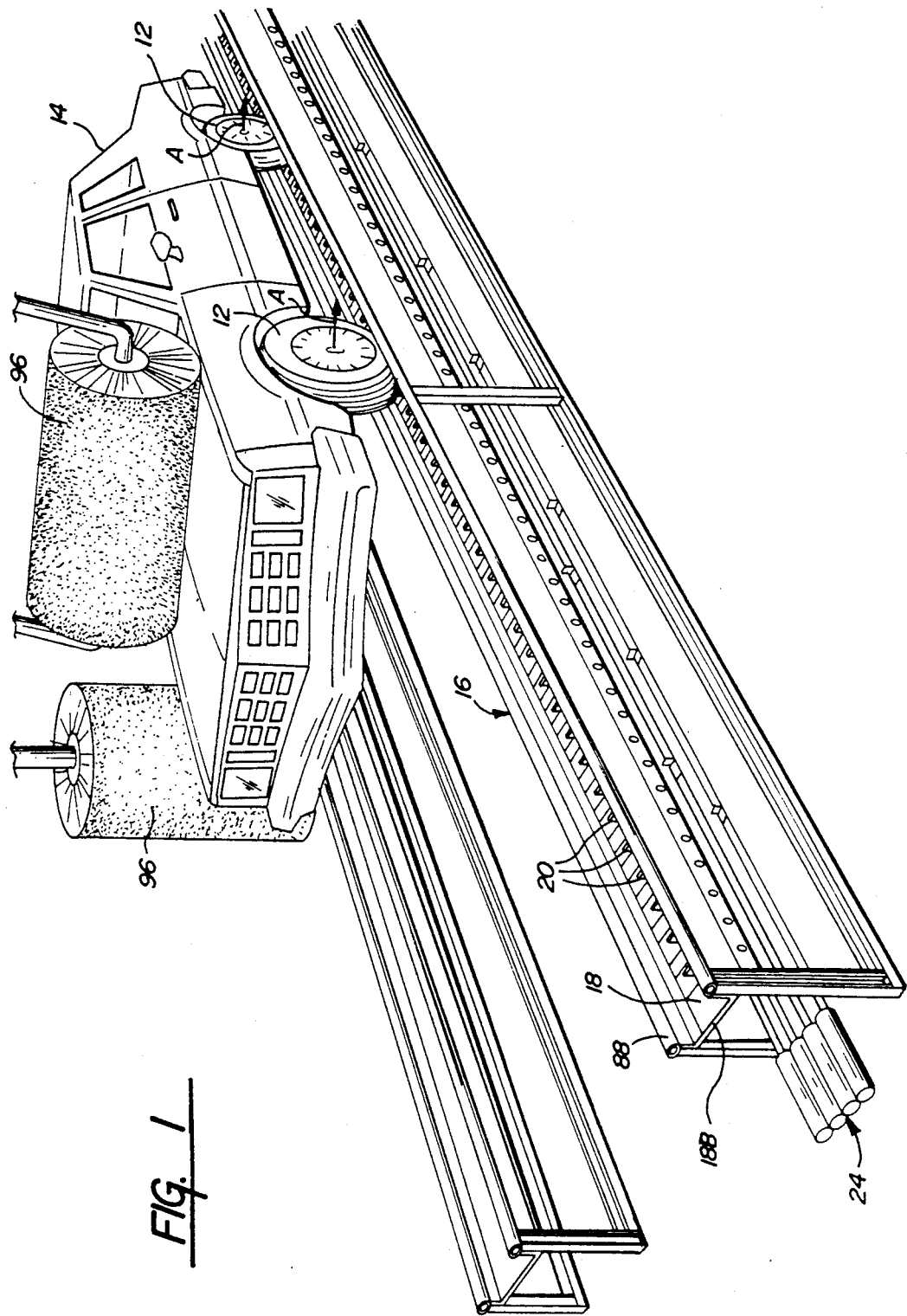
FIG. 1 is an environmental view of the subject invention disposed for operation in a car wash.
Figure 2:
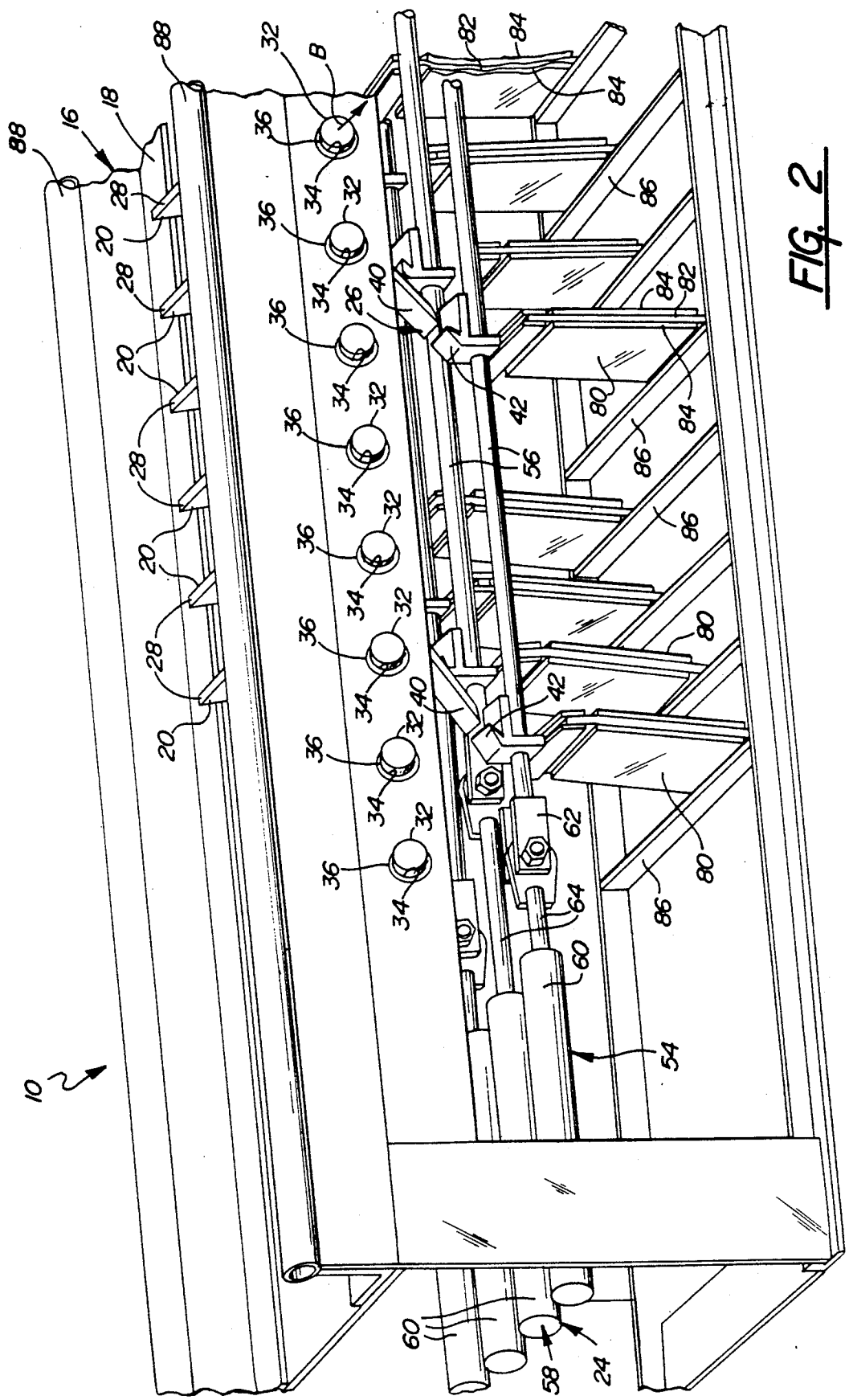
FIG. 2 is a perspective view of a portion of the conveyor according to the subject invention.

The apparatus 10 includes a guide means, generally indicated at 16 in FIGS. 1 and 2, for guiding the wheel 12 of the vehicle 14 along a longitudinally extending path 18 through the car wash. More specifically, the path 18 extends from an upstream wheel entrance end 18A to a downstream wheel exit end 18B. As shown best in FIG. 1, the guide means 16 guides the wheel 12 in a downstream direction along the path 18 with the wheel 12 being orientated so that its axis A is disposed horizontally above and transversely to the extent of the path 18.

As best shown in FIGS. 2, 3, 4, 6 and 7, the apparatus 10 further includes a plurality of pushers 20 spaced longitudinally along the path 18 and individually movable between a rest position and an actuated position for urging the wheel 12 to roll along the path 18. In FIG. 4, one of the pushers 20 is shown in phantom in the fully actuated position. The pushers 20 are spaced in uniform increments, preferably 5 inch increments, along the path 18 of the guide means 16 and are individually movable to the actuated position for applying a force upwardly and forwardly against the rear of the wheel 12 to urge the wheel 12 to roll along the path 18.

Each of the pushers 20 include a support means, generally indicated at 22, for arcuately moving the pusher 20 from the rest position to the actuated position to direct the force into the wheel 12 at an angle spaced between the wheel axis A and the circumference of the wheel 12. As shown in FIG. 15, the force directed into the wheel 12 from the pusher 20 is directed just behind, i.e., on the upstream side of, the wheel axis A to urge the wheel 12 to roll about both its point of contact on the path 18 and to urge the wheel 12 to rotate in the same direction about its axis A. The support means 22 further provides for continuously redirecting the force from the pusher 20 at an angle spaced between the wheel axis A and the circumference of the wheel 12 as the wheel 12 moves along the path 18. The wheel 12 shown in FIG. 15 is generally to scale relative to the pusher 20, and has a radius of 14 inches. The wheel 12' illustrates a 13 inch radius wheel while the wheel 12" illustrates a 15 inch radius wheel. The arrow extending into the wheel 12 from the tip of the pusher 20 indicates the direction of the force applied to the wheel 12 from the pusher 20 at the moment of the first contact between the two. As will be observed, the force extends in a direction just to the upstream side of the axis A so that the wheel 12 will rotate in the same direction both about its own axis A and about its point of contact with the path 18. The wheel 12 shown in phantom illustrates the 14 inch radius wheel moved approximately 5 inches along the path 18 and shows the resultant angle of the force applied from the pusher 20 in its fully actuated position. As will be appreciated, the angle of force extending into the wheel 12 from the fully actuated position has moved with the wheel 12 during its movement along the path 18 in order to prevent slippage, etc., between the pusher 20 and the periphery of the wheel 12.

The subject invention 10 also includes a drive means, generally indicated at 24, for individually and sequentially driving the pushers 20 from the rest position to the actuated position in response to the presence of a wheel 12 adjacent thereto to receive the force from the pusher 20 as it is moved from the rest position to the actuated position. In other words, the drive means 24 individually drives the pushers 20 forwardly and upwardly against the rear of the wheel 12 exclusively in response to the wheel 12 being in a position, relative to the path 18, to receive a force from that pusher 20 as it is moved to its actuated position. As perhaps best shown by the pusher 20 illustrated in phantom in FIG. 4, the drive means 24 has an engaged condition operatively connecting each pusher 20 individually for sequential movement toward its actuated position. Hence, the drive means 24 also has a disengaged condition from each of the pushers 20 as illustrated by all of the pushers 20 in FIG. 3.

The drive means 24 includes a clutch means, generally indicated at 26, for disengaging the drive means 24 from each of the pushers 20 to maintain the pushers 20 in their respective rest positions and for individually engaging each of the pushers 20 with the drive means 24 in response to the wheel 12 being disposed in engagement with an adjacent pusher 20. More particularly, as best shown in FIG. 4, when the wheel 12, shown in phantom, is positioned directly over one pusher 20, the clutch means 26 engages the next adjacent upstream pusher 20 with the drive means 24 to urge the pusher 20 upwardly and forwardly against the rear of the wheel 12. Conversely, the clutch means 26 maintains each pusher 20 in a disengaged stationary rest position when the wheel 12 is not disposed in engagement with the next adjacent downstream pusher 20. The clutch means 26 renders the apparatus 10 extremely safe to operate near people, in that no moving parts are presented in the work area until one of the pushers 20 is engaged by the wheel 12, and even then, only the next adjacent upstream pusher 20 is moved.

Each of the pushers 20 include a wheel-engaging edge 28 which is supported above the path 18 when the pusher 20 is in the rest position. The wheel-engaging edge 28 of the pusher 20 extends transversely to the path 18 so that the surface area of contact between the pusher 20 and the wheel 12 also extends transversely to the path 18.

Figure 6:
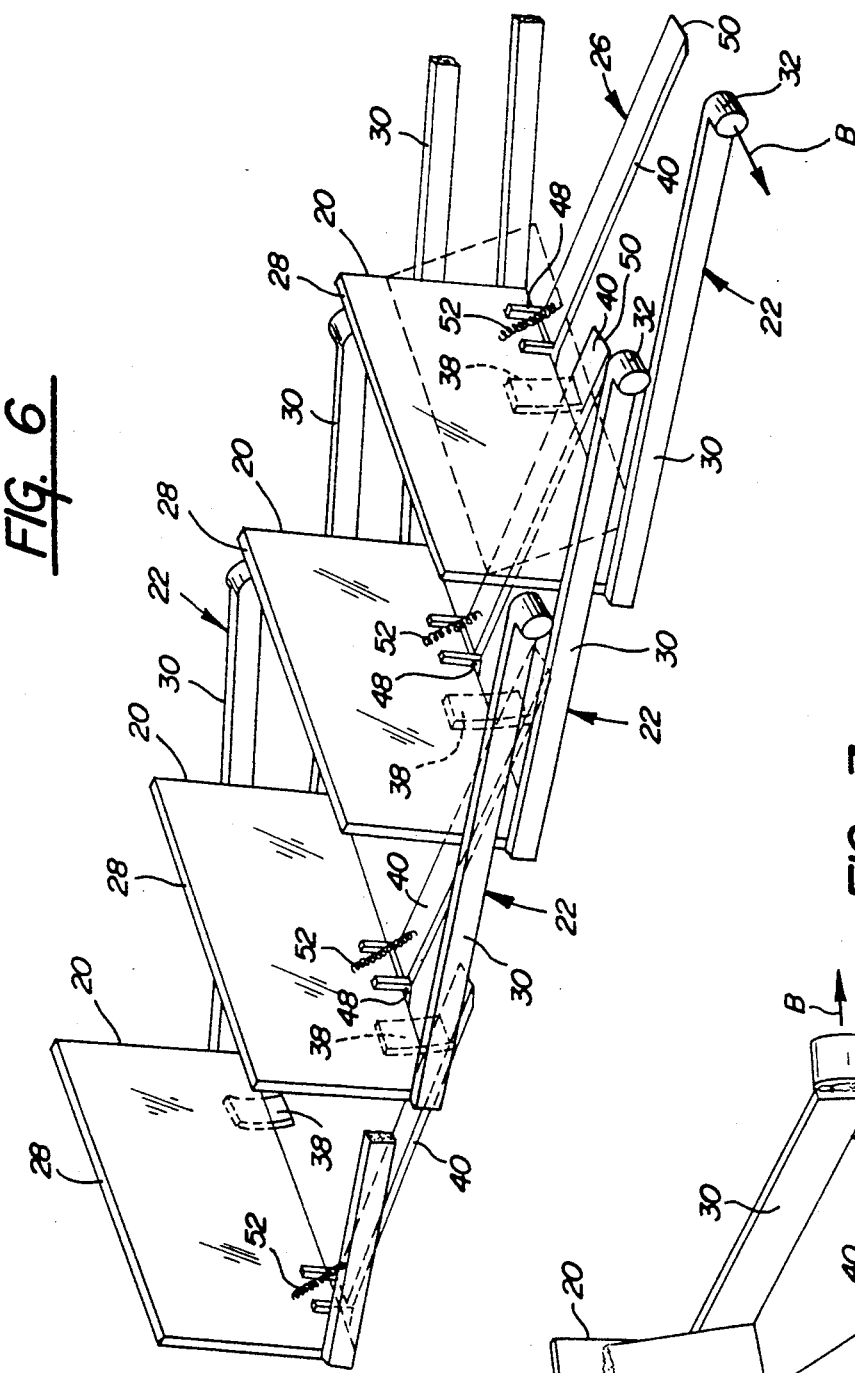
FIG. 6 is a perspective view of four pushers.
Figure 7:
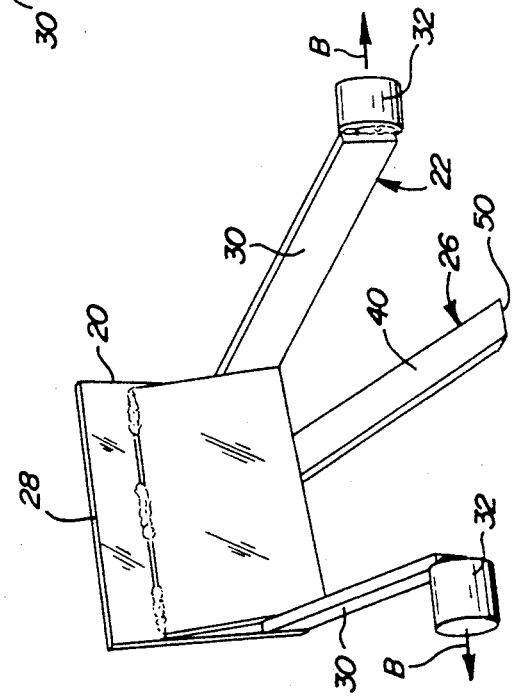
FIG. 7 is a perspective view of one pusher.
Figure 9:
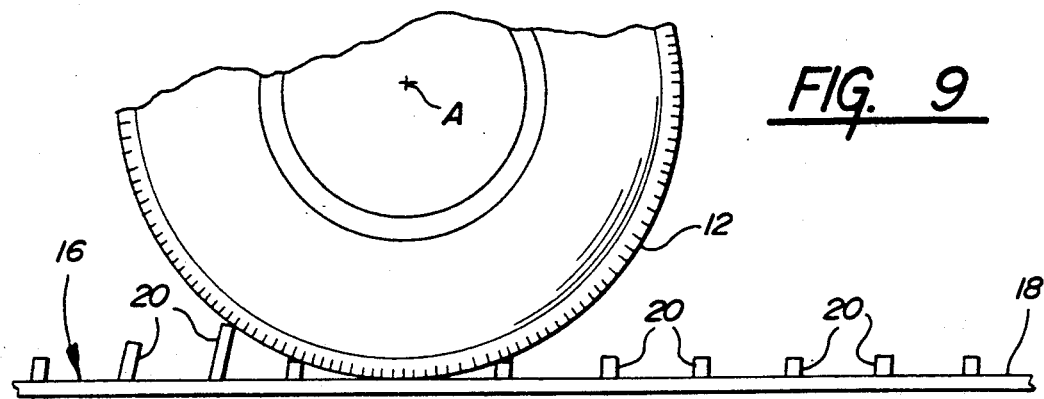
FIG. 9 is a schematic view of a wheel disposed for movement along the conveyor.
Figure 10:
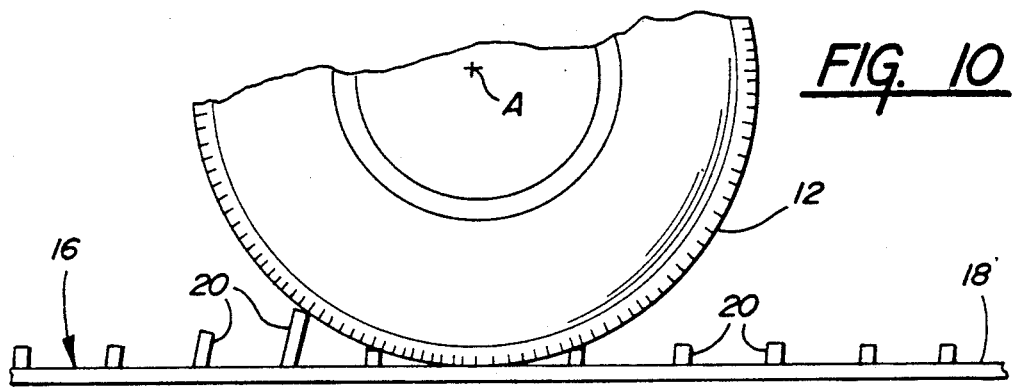
FIG. 10 is a schematic view as in FIG. 9 with the wheel moved by the conveyor a distance equal to the distance between adjacent pushers.
Figure 11:
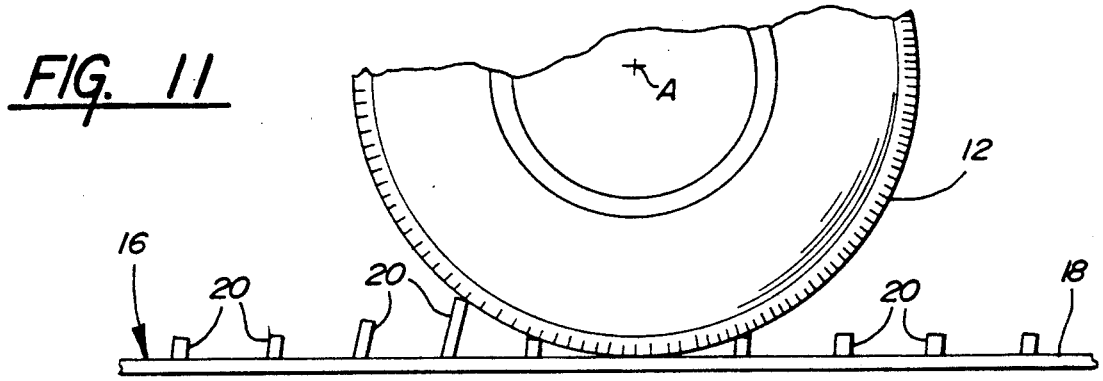
FIG. 11 is a schematic view as in FIG. 10 with the wheel moved into engagement with the next adjacent pusher from that shown in FIG. 10.
Figure 12:
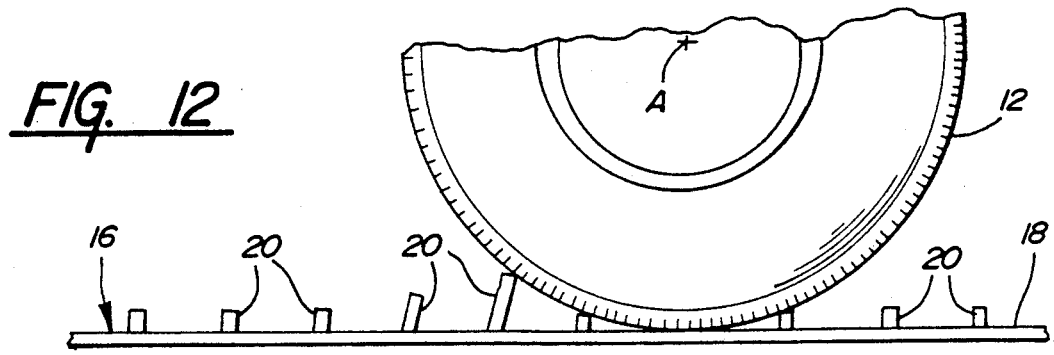
FIG. 12 is a schematic view as in FIG. 11 with the wheel moved into engagement with the next adjacent pusher from that shown in FIG. 11.

The support means 22 of each the pushers 20 includes two longitudinally extending support arms 30 pivotally attached to the guide means 16 for rotating the associated pusher 20 about an axis B disposed in a horizontal plane below and extending transversely to the path 18. The orientation of the axis B below the path 18 allows the pushers 20 to rotate into the wheel 12 at the angle spaced between the wheel axis A and the circumference of the wheel 12 and to continuously redirect the force at the angle spaced between the wheel axis A and the circumference of the wheel 12 as the wheel 12 moves along the path 18. As best shown in FIGS. 2, 6 and 7, a pivot pin 32 is disposed on the distal end of each of the support arms 30 and supported for rotation in a receptacle 34 in the guide means 16. Preferably, a nylon bushing 36 is disposed between each pivot pin 32 and its associated receptacle 34 to provide smooth pivotal movement therebetween and to eliminate the need for periodic greasing.

As best shown in FIGS. 2, 3 and 4, the clutch means 26 includes an actuator 38 disposed on each of the pushers 20. The clutch means 26 also includes a coupler 40 disposed on each of the pushers 20 for engagement with an actuator 38 of the next adjacent downstream pusher 20. In other words, as the wheel 12 engages and presses down any one pusher 20, the actuator 38 of that pusher 20 engages the coupler 40 of the next adjacent upstream pusher 20 to operatively engage that next adjacent upstream pusher 20 with the drive means 24.

The drive means 24 includes a catch 42 associated with each of the couplers 40 for applying a force to the coupler 40 to move the attached pusher 20 from its rest position to its actuated position. Therefore, there is provided one catch 42 for every pusher 20, one coupler 40 for each pusher 20 and one actuator 38 for each pusher 20. Each catch 42 includes a pocket surface 44 and a camming surface 46 disposed opposite the pocket 44.

Each of the couplers 40 are pivotally attached to the associated pusher 20 at a pivotal connection 48. The pivotal connection 48 allows the associated coupler 40 to move in an arcuate path relative to its associated pusher 20 toward and away from the associated catch 42. The distal, or free-swinging end 50 of each coupler 40 is wedge-shaped and the pocket 44 of each coupler 40 is matingly shaped to receive the distal end 50 of the coupler 40 and to retain the same therein as the drive means 24 urges the associated pusher 20 toward the actuated position. The camming surface 46 of each catch 42 is sloped in order to deflect the wedge-shaped distal end 50 of the associated coupler 40.

The clutch means 26 further includes a biasing means 52 for biasing each of the couplers 40 away from its associated catch 42. Preferably, the biasing means 52 comprises an extension spring extending between the pusher 20 and the attached coupler 40, as shown in FIG. 6. As shown in FIG. 7, and also in phantom in FIG. 6, a protective plate 54 is welded to the downstream face of the pusher 20 and extends between each of the support arms 30 to protect the pivotal connection 48 and the biasing means 52 during operation of the apparatus 10.

The subject apparatus 10 comprises a predetermined number of pushers 20. This predetermined number preferably comprises four adjacent pushers 20. Each of the four pushers 20 are preferably spaced longitudinally 5 inches from one another. The drive means 24 includes a catch displacement means 54 for moving the catches 42 in a generally longitudinal direction relative to the path 18. The catch displacement means 54, in turn, includes a predetermined number of parallel shafts 56, the predetermined number being equivalent to the predetermined number of pushers 20. That is, in the preferred embodiment, the subject apparatus 10 comprises four pushers 20 and four parallel shafts 56. The four parallel shafts 56 are supported longitudinally of the path 18 for movement along the lengths thereof. In other words, each of the shafts 56 are moved in parallel directions along their respective axes. Each shaft 56 fixedly supports one of the catches 42 so that each shaft 56 actuates a different one of the pushers 20. Said another way, one of the four shafts 56 actuates a different one of the four pushers 20. Most preferably, adjacent shafts 56 actuate adjacent pushers 20.

The shafts 56 are individually movable, along their lengths, between a common retracted position and a common extended position relative to the path 18. More particularly, as shown in FIG. 5, the catch displacement means 54 is shown with the four shafts labeled No. 1, No. 2, No. 3, and No. 4, respectively. The No. 1 shaft 56 is shown in the common retracted position while the No. 3 shaft 56 is shown in the common extended position. Each of the shafts 56 are movable between the two positions shown by shaft No. 1 and shaft No. 3. Therefore, each of the four shafts 56 are displaced equivalent distances from on another.

As also shown in FIG. 5, the drive means 24 further includes a longitudinal displacement means, generally indicated at 58, associated with each of the shafts 56 for controlling the longitudinal displacement of each of the shafts 56 to continuously space each of the shafts 56 equally from one another between the retracted and extended positions. That is, the longitudinal displacement means 58 maintains each of the shafts 56 in different positions relative to the common retracted and extended positions. Defining the distance between the common retracted position and the common extended position as one full stroke, and given the fact that there are four shafts 56, the longitudinal displacement means 58 spaces each of the shafts 56 one-half of one full stroke from the next adjacent shaft 56. To more accurately describe the controlling function of the longitudinal displacement means 58, reference may be had to FIG. 8 wherein a displacement diagram per unit of time is illustrated showing the instantaneous displacement of each of the four shafts 56 at any given time t. More particularly, at time $t_0$, shaft No. 1 is shown in a retracted position, thus having a displacement of 0. Shaft No. 2 is shown at the one-half stroke position moving toward the full stroke position. Shaft No. 3 is shown at the full stroke position. Shaft No. 4 is shown at the one-half stroke position moving toward the fully retracted position. At time $t_1$, each of the four shafts 56 have moved through the next half stroke, with shaft No. 1 being at the half stroke position moving toward the full stroke position, shaft No. 2 being at the full stroke position, shaft No. 3 being at the half stroke position moving toward the retracted position, and shaft No. 4 being at the retracted position. The cycle continues in like fashion until time $t_4$ wherein each of the four shafts 56 have returned to the same position as that described at time $t_0$.

Figure 13:
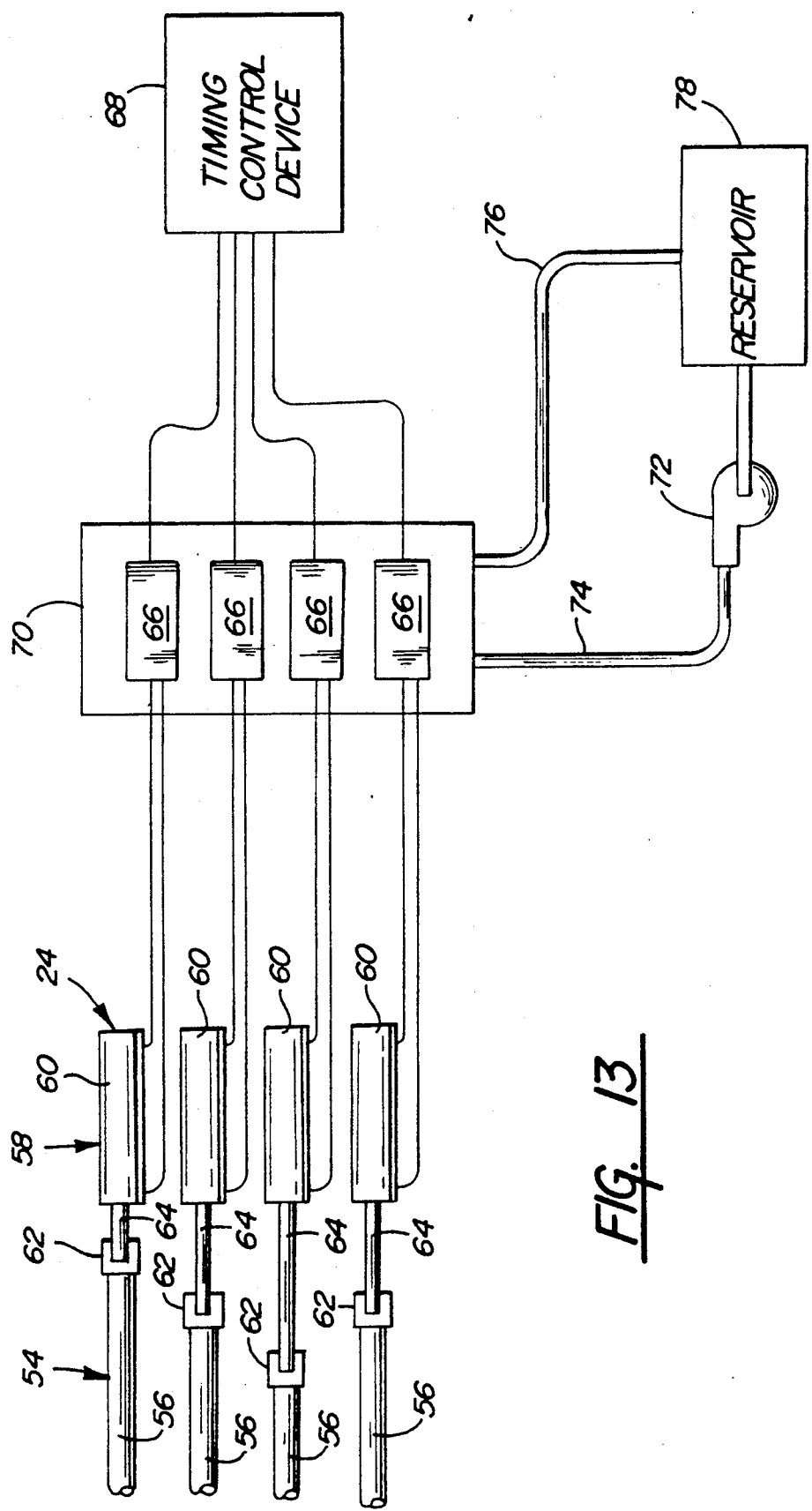
FIG. 13 is a schematic view of the longitudinal displacement means of the subject invention.

As best shown in FIGS. 2, 5 and 13, the longitudinal displacement means 58 includes one fluid pressure-responsive piston/cylinder mechanism 60 associated with each of the shafts 56 for independently moving the shafts 56 between their respective retracted and extended positions. A clevis 62 pivotally attaches each of the shafts 56 with a piston rod 64 extended outwardly from the associated cylinder 60. At least one flow control valve 66 is associated with each of the cylinders 60 for directing hydraulic fluid at predetermined times to opposite ends of the cylinder 60, as shown in FIG. 13. A timing control device 68 independently controls each of the valves 66 at predetermined times to direct flow between opposite ends of the cylinder 60. The valves 66 are supported over a common manifold 70. A hydraulic pump 72 moves hydraulic fluid through a conduit 74, and into the manifold 70. Any return, excess or unused hydraulic fluid is routed from the manifold 70 through a return line 76 to a reservoir 78. The timing control device 68 electrically signals each of the valves 66 to open and close fluid flow passages disposed between the valve 66 and the manifold 70 to allow hydraulic fluid from the conduit 74 to pass to and from their respective cylinders 60.

Preferably, the drive means 24 is disposed below the path 18 and below the array of pushers 20 to facilitate placement of the subject apparatus 10 in the preformed receptacle for a conventional conveyor in a car wash. The drive means 24 further includes a plurality of support members 80 independently supporting each of the shafts 56 for generally linear movement, as shown in FIGS. 2, 3 and 4. The support members 80 each comprise a sheet-like core layer 82 of flexible material, such as rubber, and two sheet-like rigid outer support layers 84 disposed on opposite sides of the core layer 82. The outer supporting layers 84 are oriented on the core layer 82 in such a manner to form a pivot point adjacent the shaft 56 and another pivot point adjacent the bottom of the support member 80. Each support member 80 extends between the associated shaft 56 and a lower cross member 86. Preferably, each support member 80 is disposed directly below a catch 42. The support members 80 are restricted to general plane motion due to the specific shape, composition and method of attachment to the shaft 56 and cross member 86. The preferred embodiment of the support members 80, as described above, are advantageous over a linear bearing type support system due to the fact that lubrication is not required.

As perhaps best shown in FIG. 2, the guide means 16 includes two longitudinally extending rails 88 spaced transversely from one another across a path 16 and disposed for receiving the wheel 12 therebetween. The rails 88 prevent the dirigible wheel(s) 12 of the vehicle 14 from moving off the path 18. The guide means 16 also includes a wheel support plate 90 disposed transversely between each of the adjacent pushers 20. The wheel support plate 90 forms the rolling surface over which a wheel 12 rolls along the path 18.

As best shown in FIGS. 3 and 4, each of the pushers 20 include a return means 92 for urging the associated pusher 20 toward its rest position The return means, more specifically, comprises both the application of gravity upon the pusher 20 for urging the pusher 20 back toward the rest position from an actuated position, and also a spring 94 for urging each pusher 90 toward the rest position after it has been engaged by the wheel 12.

As shown in the FIGURES, the subject invention preferably includes a plurality of pushers 20 in addition to the predetermined number of four pushers 20. The additional pushers 20 extend along the path 18 and are actuated between respective rest and actuated positions by the same four shafts 56. That is to say, the same four shafts 56 actuate the predetermined number of four pushers 20, as well as the additional plurality of pushers 20. In this arrangement, each one of the shafts 56 actuate every fifth one of the pushers 20. For example, if the subject apparatus 10 included one hundred pushers 20, each of the four shafts 56 would actuate twenty-five pushers 20. Each of the twenty-five pushers 20 actuated by any one of the shafts 56 would be spaced from each other with three other pushers 20 between, each of those three in-between pushers 20 being actuated by different shafts 56.

As best shown in FIGS. 5 and 8, the longitudinal displacement means 58 and the shafts 56 are so arranged that the engagement order, or sequencing of pushers 20, move to the actuated position by a wheel 12 moving along the path 18 with actuation first of a pusher 20 by the shaft No. 4, then actuation of the next adjacent downstream pusher 20 by the shaft No. 3, then actuation of the next adjacent downstream pusher 20 by the shaft No. 2, and finally actuation of the next adjacent downstream pusher 20 by the shaft No. 1. This engagement order repeats itself indefinitely for the length of the conveyor 10.

Because of this sequencing order, the drive means has the effect of sequentially moving each of the pushers 20 toward their actuated positions in a longitudinally propagating continuous wave behind the wheel 12 to smoothly roll the wheel 12 along the path 18. More specifically, the drive means 24 sequentially moves adjacent pushers 20 toward their actuated positions and then back to the rest position at a generally right angle to the direction of propagation of the apparent wave. Therefore, such a wave is said to be transverse as well as linearly polarized in that the displacements of each of the pushers 20 at every position along the path are parallel. However, due to the operation of the clutch means 26, such a longitudinally propagating continuous wave can only be created when an object, such as a wheel 12, is disposed for rolling engagement along the path 18 such that as each pusher 20 is actuated by the drive means 24 to roll the wheel 12 farther downstream along the path 18, the wheel rolls into engagement with another pusher 20 to disengage the clutch means 26 and thereby couple the drive means 24 with the next adjacent pusher 20 to urge the wheel 12 to continue rolling along the path 18.

OPERATION OF THE PREFERRED EMBODIMENT

The subject invention 10 is particularly well-adapted for moving a vehicle 14 through a washing facility. Such washing facilities typically comprise some form of washer means 96 for washing the exterior surface of the vehicle 14. The vehicle 14 is positioned with two of its wheels 12 engaged in the subject conveyor 10 where the guide means 16 guides the wheels 12 for rolling movement along the path 18. As soon as one of the wheels 12 is positioned adjacent to one of the pushers 20 in a position to receive a force from the pusher 20 as it is moved from its rest position to its actuated position, that pusher 20 applies a force upwardly and forwardly against the rear of the wheel 12 to urge the wheel to roll along the path. Thus, as the wheel 12 of the vehicle 14 rolls along the path 18, the pushers 20 are sequentially moved between their respective rest and actuated positions in a longitudinally propagating continuous wave behind the wheel 12 to smoothly roll the wheel 12 along the path 18. More particularly, each of the pushers 20 are maintained in their respective rest positions by the clutch means 26 and individually moved toward the actuated position in response to the wheel 12 being disposed in engagement with the next adjacent upstream pusher 20. When actuated, each of the pushers 20 rotate about their respective axes into the rear of the wheel 12, with the axis B of each pusher 20 disposed in a horizontal plane below and extending transversely to the path 18.

As the wheel 12 engages a pusher 20 and thereby urges the pusher 20 down such that its actuator 38 pivots the next adjacent upstream coupler 40 into engagement with engagement with a catch 42, the linear movement of the catch displacement means 54 is converted into arcuate movement by the associated pusher 20 to move that pusher 20 from the rest to the actuated position. This causes the wheel 12 to roll along the path 18 and into engagement with the next pusher 20 downstream of the first engaged pusher 20, thereby disengaging the clutch means 26 from that first engaged pusher 20 and causing the first engaged pusher 20 to rotate into the wheel 12. Thus, the cycle is sequentially repeated until the wheel 12 is moved to the downstream wheel exit end 18B of the conveyor 10.

Generally, the drive means 24 operates on a continuous basis whereby the shafts 56 are continuously moving. Because the clutch means 26 disconnects each of the pushers 20 from the drive means 24, the pushers 20 remain in the rest position until actuated by the wheel 12. However, in the vehicle washing art, it is preferable to provide a first conveyor portion 10', as shown in FIG. 14, which comprises the section of the conveyor 10 adjacent the upstream end 18A of the path 18. Also, a second conveyor portion 10" is provided adjacent the downstream end 18B of the path 18 and operated independently of the first portion 10'. In other words, the entire apparatus 10 is comprised of a first portion 10' adjacent the upstream end 18A and a much longer second portion 10" extending from the first portion 10' to the downstream end 18B. The entire conveyor apparatus 10 is controlled by a master control panel 98 located remotely of the first 10' and second 10" portions. The master control panel 98 operates the second portion 10" continuously such that the drive means 24 continuously moves the shafts 56 while the washing facility is open for business. On the other hand, the master control panel 98 operates the first portion 10' intermittently, i.e., turns on and turns off the drive means 24 at select times in order to facilitate a precleaning operation of the vehicle 14. Specifically, a vehicle 14 will be driven under its own power onto the first portion 10' of the conveyor 10 and stopped, with the drive means 24 of the first portion 10' turned off. The vehicle 14 thus remains stationary upon the first portion 10' while an operator of the washing facility precleans certain portions of the vehicle 14 which typically are missed or inadequately cleaned by the washer means 96. When the precleaning operation is complete, the master control panel 98 will be operated to turn on the drive means 24 of the first portion 10, and thereby urge the vehicle 14 to move along the path 18 and onto the second portion 10,, of the conveyor 10. The continuously operating second portion 10" continues to move the vehicle 14 along the path 18 and through the washing means 96 to completely clean the exterior surface of the vehicle 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicular conveying apparatus (10) of the type for rolling a wheel (12) along a linear path (18), said apparatus (10) comprising: guide means (16) for guiding the wheel (12) along a longitudinally extending path (18); a plurality of pushers (20) spaced longitudinally along said path (18) and individually moveable between a rest position and an actuated position for urging the wheel (12) to roll along said path (18); drive means (24) having an engaged condition operatively connected to said pushers (20) for sequentially driving said pushers (20) from said rest position to said actuated position; and characterized by said drive means (24) including clutch means (26) for disengaging said drive means (24) from each of said pushers (20) to maintain said pushers (20) in said respective rest positions and for individually engaging each of said pushers (20) with said drive means (24) in response to the wheel (12) being disposed in engagement with an adjacent pusher (20).

2. An apparatus (10) as set forth in claim 1 further characterized by each of said pushers (20) including a wheel engaging edge (28) supported above said path (18) when in said rest position.

3. An apparatus (10) as set forth in claim 2 further characterized by said wheel engaging edge (28) of said pusher (20) extending transversely of said path (18).

4. An apparatus (10) as set forth in claim 3 wherein said path (18) extends from an upstream wheel entrance end (18A) to a downstream wheel exit end (18B), further characterized by said clutch means (26) including an actuator (38) disposed on each of said pushers (20), and a coupler (40) disposed on each of said pushers (20) for engagement with said actuator (38) of said next adjacent downstream pusher (20).

5. An apparatus (10) as set forth in claim 4 further characterized by said drive means (24) including a catch (42) associated with each of said couplers (40) for applying a force to said coupler (40) to move the pusher (20) associated with said coupler (40) from said rest position to said actuated position.

6. An apparatus (10) as set forth in claim 5 further characterized by each of said pushers (20) including a support arm (30) pivotally attached to said guide means (16) for rotating said pusher (20) about an axis disposed in a horizontal plane below and extending transversely to said path (18).

7. A vehicular conveying apparatus (10) of the type for rolling a wheel (12) along a linear path (18), said apparatus (10) comprising: a wheel (12) having an axis of rotation (A); guide means (16) for guiding said wheel (12) along a longitudinally extending path (18) with said wheel axis (A) disposed horizontally above and transversely to said path (18); a plurality of pushers (20) spaced in uniform increments along said path (18) of said guide means (16) and individually moveable between a rest position and an actuated position for applying a force upwardly and forwardly against the rear of said wheel (12) to urge said wheel (12) to roll along said path (18); and drive means (24) for sequentially driving said pushers (20) from said rest position to said actuated position; said apparatus (10) characterized by each of said pushers (20) including support means (22) for arcuately moving said pusher (20) from said rest position to said actuated position to direct the force into said wheel (12) at an angle spaced between said wheel axis (A) and the circumference of said wheel (12) and for continuously redirecting the force at an angle spaced between said wheel axis (A) and the circumference as said wheel (12) moves along said path (18).

8. An apparatus (10) as set forth in claim 7 further characterized by each of said pushers (20) including a support arm (30) pivotally attached to said guide means (16) for rotating said pusher (20) about an axis (B) disposed in a horizontal plane below and extending transversely to said path (18).

9. An apparatus (10) as set forth in claim 8 further characterized by each of said pushers (20) including a wheel engaging edge (28) supported above said path (18) when in said rest position.

10. An apparatus (10) as set forth in claim 9 further characterized by said wheel engaging edge (28) of said pusher (20) extending transversely of said path (18).

11. An apparatus (10) as set forth in claim further characterized by said drive means (24) including clutch means (26) disposed between each of said pushers (20) and said drive means (24) for disengaging said drive means (24) from each of said pushers (20) to maintain said pushers (20) in said respective rest positions and for individually engaging each of said pushers (20) and said drive means (24) in response to the wheel (12) being disposed in engagement with an adjacent pusher (20).

12. An apparatus (10) as set forth in claim 11 wherein said path (18) includes an upstream wheel entrance end (18A) and a downstream wheel exit end (18B), further characterized by said clutch means (26) including an actuator (38) disposed on each of said pushers (20), and a coupler (40) disposed on each of said pushers (20) for engagement with said actuator (38) of said next adjacent downstream pusher (20).

13. An apparatus (10) as set forth in claim 12 further characterized by said drive means (24) including a catch (42) associated with each of said couplers (40) for applying a force to said coupler (40) to move the pusher (20) associated with said coupler (40) from said rest position to said actuated position.

14. A vehicular conveying apparatus (10) of the type for rolling a wheel (12) along a linear path (18), said apparatus (10) comprising: guide means (16) for guiding the wheel (12) along a longitudinally extending path (18); a plurality of pushers (20) spaced longitudinally along said path (18) and individually moveable between a rest position and an actuated position for urging the wheel (12) to roll along said path (18); and characterized by including continuously moving drive means (24) for individually and sequentially driving said pushers (20) from said rest position to said actuated position in response to the presence of a wheel (12) adjacent thereto to receive the force from said pusher (20) as it is moved from said rest position to said actuated position, said drive means (24) including clutch means (26) disposed between each of said pushers (20) and said drive means (24) for disengaging said continuously moving drive means (24) from each of said pushers (20) to maintain said pushers (20) in said respective rest positions and for individually engaging each of said pushers (20) and said continuously moving drive means (24) in response to the wheel (12) being disposed in engagement with an adjacent pusher (20).

15. An apparatus (10) as set forth in claim 14 further characterized by each of said pushers (20) including a wheel engaging edge (28) supported above said path (18) when in said rest position.

16. An apparatus (10) as set forth in claim 15 further characterized by said wheel engaging edge (28) of said pusher (20) extending transversely of said path (18).

17. An apparatus (10) as set forth in claim 16 wherein said path (18) extends from an upstream wheel entrance end (18A) to a downstream wheel exit end (18B), further characterized by said clutch means (26) including an actuator (38) disposed on each of said pushers (20), and a coupler (40) disposed on each of said pushers (20) for engagement with said actuator (38) of said next adjacent downstream pusher (20).

18. An apparatus (10) as set forth in claim 17 further characterized by said drive means (24) including a catch (42) associated with each of said couplers (40) for applying a force to said coupler (40) to move the pusher (20) associated with said coupler (40) from said rest position to said actuated position.

19. An apparatus (10) as set forth in claim 18 further characterized by each of said pushers (20) including a support arm (30) pivotally attached to said guide means (16) for rotating said pusher (20) about an axis (B) disposed in a horizontal plane below and extending transversely to said path (18).

20. A vehicular conveying apparatus (10) of the type for rolling a wheel (12) of a vehicle (14) along a linear path (18) in a washing facility, said apparatus (10) comprising: washer means (96) for washing the exterior surface of the vehicle (14); guide means (16) for guiding the wheel (12) of the vehicle (14) along a path (18) extending longitudinally through said washing means (96); a plurality of pushers (20) spaced longitudinally along said path (18) and individually moveable between a rest position and an actuated position for urging the wheel (12) to roll from an upstream end (18A) of said path (18) toward a downstream end (18B) of said path (18); drive means (24) for individually and sequentially driving said pushers (20) from said rest position to said actuated position in response to the presence of a wheel (12) adjacent thereto to receive the force from said pusher (20) as it is moved from said rest position to said actuated position; and characterized by said apparatus (10) including a first conveyor portion (10') adjacent said upstream end (18A) of said path (18) and a second conveyor portion (10") adjacent said downstream end (18B) of said path (18) and operated independently of said first portion (10').

21. An apparatus (10) as set forth in claim 20 further characterized by each of said pushers (20) including a wheel engaging edge (28) supported above said path (18) when in said rest position.

22. An apparatus (10) as set forth in claim 21 further characterized by said wheel engaging edge (28) of said pusher (20) extending transversely of said path (18).

23. An apparatus (10) as set forth in claim 22 further characterized by said drive means (24) including clutch means (26) disposed between each of said pushers (20) and said drive means (24) for disengaging said drive means (24) from each of said pushers (20) to maintain said pushers (20) in said respective rest positions and for individually engaging each of said pushers (20) and said drive means (24) in response to the wheel (12) being disposed in engagement with an adjacent pusher (20).

24. An apparatus (10) as set forth in claim 23 wherein said path (18) extends from an upstream wheel entrance end (18A) to a downstream wheel exit end (18B), further characterized by said clutch means (26) including an actuator (38) disposed on each of said pushers (20), and a coupler (40) disposed on each of said pushers (20) for engagement with said actuator (38) of said next adjacent downstream pusher (20).

25. An apparatus (10) as set forth in claim 24 further characterized by said drive means (24) including a catch (42) associated with each of said couplers (40) for applying a force to said coupler (40) to move the pusher (20) associated with said coupler (40) from said rest position to said actuated position.

26. An apparatus (10) as set forth in claim 25 further characterized by each of said pushers (20) including a support arm (30) pivotally attached to said guide means (16) for rotating said pusher (20) about an axis (B) disposed in a horizontal plane below and extending transversely to said path (18).

27. An apparatus (10) as set forth in any one of claims 6, 13, 19 or 26 further characterized by each of said couplers (40) being disposed for pivotal movement relative to said associated pusher (20) toward and away from said associated catch (42).

28. An apparatus (10) as set forth in claim 27 further characterized by said clutch means (26) including biasing means (52) for biasing each of said couplers (40) away from said associated catch (42).

29. An apparatus (10) as set forth in claim 28 further characterized by said drive means (24) including catch displacement means (54) for moving said catches (42) in a generally longitudinal direction relative to said path (18).

30. An apparatus (10) as set forth in claim 29 wherein said apparatus (10) comprises a predetermined number of said pushers (20), further characterized by said catch displacement means (54) including a predetermined number of parallel shafts (56) equivalent to said predetermined number of said pushers (20) and supported longitudinally of said path (18) for movement along the lengths thereof, each of said shafts (56) fixedly supporting one of said catches (42) for actuating a different one of said pushers (20).

31. An apparatus (10) as set forth in claim 30 wherein each of said shafts (56) are moveable between a common retracted position and a common extended position relative to said path (18), further characterized by said drive means (24) including longitudinal displacement means (58) associated with each of said shafts (56) for controlling the longitudinal displacement of each of said shafts (56) to continuously space each of said shafts (56) equally from one another between said retracted and extended positions.

32. An apparatus (10) as set forth in claim 31 further characterized by said longitudinal displacement means (58) including a fluid responsive cylinder (60) associated with each of said shafts (56) for independently moving said shafts (56) between said respective retracted and extended positions.

33. An apparatus (10) as set forth in claim 32 further characterized by said longitudinal displacement means (58) including a least one flow control valve (66) associated with each of said cylinders (60), and a timing control device (68) for independently controlling said valves (66) at predetermined times to direct flow between opposite ends of said cylinders (60).

34. An apparatus (10) as set forth in claim 33 further characterized by said drive means (24) being disposed below said path (10) and below said pushers (20).

35. An apparatus (10) as set forth in claim 34 further characterized by each of said pushers (20) including return means (92) for urging said associated pusher (20) toward said rest position.

36. An apparatus (10) as set forth in claim 35 further characterized by said guide means (16) including a wheel support plate (90) disposed transversely between each of said adjacent pushers (20).

37. An apparatus (10) as set forth in claim 36 further characterized by said drive means (24) including a plurality of support members (80) independently supporting each of said shafts (56) for generally linear movement, each of said support members (80) being restricted to general plane motion.

38. An apparatus (10) as set forth in claim 37 further characterized by said guide means (16) including two longitudinally extending rails (88) spaced transversely from one another across said path (18).

39. An apparatus (10) as set forth in claim 38 further characterized by including a plurality of said pushers (20) in addition to said predetermined number of said pushers (20) extending along said path (18) and actuated between said rest and said actuated positions by said predetermined number of said shafts (56).

40. An apparatus (10) as set forth in claim 39 further characterized by said predetermined number of said pushers (20) and said predetermined number of said shafts (56) comprising four.

41. An apparatus (10) as set forth in claim 40 further characterized by every fifth one of said pushers (20) being actuated by the same one of said shafts (56).

42. A vehicular conveying apparatus (10) of the type for rolling a wheel (12) along a linear path (18), said apparatus (10) comprising: a longitudinally extending path (18) defining a rolling support surface for supporting a rolling wheel (12) thereabove; guide means (16) for guiding the wheel (12) along said longitudinally extending path (18); a plurality of pushers (20) spaced longitudinally along said path (18) and individually moveable between a rest position and an actuated position directly above said support surface of said path (18) for urging the wheel (12) to roll along said path (18); and characterized by including drive means (24) for sequentially moving said pushers (20) toward said actuated positions in a longitudinally propagating continuous wave directly above said support surface of said path (18) and behind the wheel (12) to smoothly roll the wheel (12) along said path (18).

43. An apparatus (10) as set forth in claim 42 further characterized by including clutch means (26) disposed between each of said pushers (20) and said drive means (24) for disengaging said drive means (24) from each of said pushers (20) to maintain said pushers (20) in said respective rest positions and for individually engaging each of said pushers (20) and said drive means (24) in response to the wheel (12) being disposed in engagement with an adjacent pusher (20).

44. An apparatus (10) as set forth in claim 43 further characterized by said clutch means (26) including an actuator (38) disposed on each of said pushers (20), and a coupler (40) disposed on each of said pushers (20) for engagement with said actuator (38) of said next adjacent downstream pusher (20).

45. An apparatus (10) as set forth in claim 44 further characterized by said drive means (24) including a catch (42) associated with each of said couplers (40) for applying a force to said coupler (40) to move the pusher (20) associated with said coupler (40) from said rest position to said actuated position.

46. An apparatus (10) as set forth in claim 45 further characterized by each of said pushers (20) including a support arm (30) pivotally attached to said guide means (16) for rotating said pusher (20) about an axis (B) disposed in a horizontal plane below and extending transversely to said path (18).

47. An apparatus (10) as set forth in claim 46 further characterized by each of said couplers (40) being disposed for pivotal movement relative to said associated pusher (20) toward and away from said associated catch (42).

48. An apparatus (10) as set forth in claim 47 further characterized by said clutch means (26) including biasing means (52) for biasing each of said couplers (40) away from said associated catch (42).

49. An apparatus (10) as set forth in claim 48 further characterized by said drive means (24) including catch displacement means (54) for moving said catches (42) in a generally longitudinal direction relative to said path (18).

50. An apparatus (10) as set forth in claim 49 wherein said apparatus (10) comprises a predetermined number of said pushers (20), further characterized by said catch displacement means (54) including a predetermined number of parallel shafts (56) equivalent to said predetermined number of said pushers (20) and supported longitudinally of said path (18) for movement along the lengths thereof, each of said shafts (56) fixedly supporting one of said catches (42) for actuating a different one of said pushers (20).

51. An apparatus (10) as set forth in claim 50 wherein each of said shafts (56) are moveable between a common retracted position and a common extended position relative to said path (18), further characterized by said drive means (24) including longitudinal displacement means (58) associated with each of said shafts (56) for controlling the longitudinal displacement of each of said shafts (56) to continuously space each of said shafts (56) equally from one another between said retracted and extended positions.

52. An apparatus (10) as set forth in claim 51 further characterized by said longitudinal displacement means (58) including a fluid responsive cylinder (60) associated with each of said shafts (56) for independently moving said shafts (56) between said respective retracted and extended positions.

53. An apparatus (10) as set forth in claim 52 further characterized by said longitudinal displacement means (58) including a least one flow control valve (66) associated with each of said cylinders (60), and a timing control device (68) for independently controlling said valves (66) at predetermined times to direct flow between opposite ends of said cylinders (60).

54. An apparatus (10) as set forth in claim 53 further characterized by including a plurality of said pushers (20) in addition to said predetermined number of said pushers (20) extending along said path (18) and actuated between said rest and said actuated positions by said predetermined number of said shafts (56).

55. An apparatus (10) as set forth in claim 54 further characterized by four of said pushers (20) four of said shafts (56).

56. An apparatus (10) as set forth in claim 55 further characterized by every fifth one of said pushers (20) being actuated by the same one of said shafts (56).

57. An apparatus (10) as set forth in claim 56 further characterized by each of said pushers (20) including a wheel engaging edge (28) supported above said path (18) when in said rest position.

58. An apparatus (10) as set forth in claim 57 further characterized by said wheel engaging edge (28) of said pusher (20) extending transversely of said path (18).

59. An apparatus (10) as set forth in claim 58 further characterized by said drive means (24) being disposed below said path (18) and below said pushers (20).

60. An apparatus (10) as set forth in claim 59 further characterized by each of said pushers (20) including return means (92) for urging said associated pusher (20) toward said rest position.

61. An apparatus (10) as set forth in claim 60 further characterized by said guide means (16) including a wheel support plate (90) disposed transversely between each of said adjacent pushers (20).

62. An apparatus (10) as set forth in claim 61 further characterized by said drive means (24) including a plurality of support members (80) independently supporting each of said shafts (56) for generally linear movement, each of said support members (80) being restricted to general plane motion.

63. An apparatus (10) as set forth in claim 62 further characterized by said guide means (16) including two longitudinally extending rails (88) spaced transversely from one another across said path (18).

64. A vehicular conveying apparatus (10) of the type for rolling a wheel (12) along a linear path (18), said apparatus (10) comprising: guide means (16) for guiding the wheel (12) along a longitudinally extending path (18), said path (18) having an upstream wheel entrance end (18A) and a downstream wheel exit end (18B); a predetermined number of pushers (20) spaced longitudinally along said path (18); each of said pushers (20) including a wheel engaging edge (28) extending transversely of said path (18); a support arm (30) extending from each of said pushers (20) and pivotally attached to said guide means (16) for rotating said pusher (20) about an axis disposed in a horizontal plane below and extending transversely to said path (18); a predetermined number of parallel shafts (56) equivalent to said predetermined number of pushers (20); a catch (42) disposed on each of said shafts (56) and associated with a different one of said pushers (20); an actuator (38) disposed on each of said pushers (20); a coupler (40) pivotally disposed on each of said pushers (20) for engagement with said actuator (38) of said next adjacent downstream pusher (20) and moveable toward and away from said associated catch (42); a fluid responsive cylinder (60) associated with each of said shafts (56); at least one flow control valve (66) associated with each of said cylinders (60); a timing control device (68) associated with said valves (66) for independently controlling said valves (66) at predetermined times to direct flow between opposite ends of said cylinders (60); and a wheel support plate (90) disposed transversely between each of said adjacent pushers (20).

65. A method for rolling a wheel (12) along a predetermined path (18), the method comprising the steps of: guiding the wheel (12) for rolling movement along a predetermined path (18); sequentially moving one of a plurality of pushers (20) between a rest position having a predetermined spacing from the path (18) and an actuated position having a spacing from the path (18) greater than the predetermined spacing of the rest position; applying a force upwardly and forwardly against the rear of the wheel (12) from each of the pushers (20) to urge the wheel (12) to roll along the path (18); and characterized by maintaining each of the pushers (20) in their respective rest positions and individually moving each pusher (20) toward the actuated position in response to the wheel (12) being disposed in engagement with an adjacent pusher (20).

66. A method as set forth in claim 65 further characterized by rotating each of the pushers (20) about respective axes (B) disposed in a horizontal plane below and extending transversely to the path (18).

67. A method for rolling a wheel (12) along a predetermined path (18), the method comprising the steps of: guiding the wheel (12) for rolling movement along a predetermined path (18); sequentially moving one of a plurality of pushers (20) between a rest position and an actuated position; applying a force upwardly and forwardly against the rear of the wheel (12) from each of the pushers (20) to urge the wheel (12) to roll along the path (18); and characterized by rotating each of the pushers (20) into the wheel (12) about respective axes (B) disposed in a horizontal plane below and extending transversely to the path (18).

68. A method for rolling a wheel (12) along a predetermined path (18), the method comprising the steps of: guiding the wheel (12) for rolling movement along a predetermined path (18); sequentially moving one of a plurality of pushers (20) between a rest position and an actuated position; applying a force upwardly and forwardly against the rear of the wheel (12) from each of the pushers (20) to urge the wheel (12) to roll along the path (18); and characterized by individually and sequentially rotating each of the pushers (20) about respective axes (B) disposed in a horizontal plane below and extending transversely to the path (18) from the rest position to the actuated position in response to the presence of a wheel (12) adjacent thereto to receive the force from each pusher (20) as it is rotated from the rest position to the actuated position.

69. A method for rolling a wheel (12) along a predetermined path (18), the method comprising the steps of: guiding the wheel (12) for rolling movement along a predetermined path (18); sequentially moving one of a plurality of pushers (20) between a rest position and an actuated position; applying a force upwardly and forwardly against the rear of the wheel (12) from each of the pushers (20) to urge the wheel (12) to roll along the path (18); and characterized by sequentially rotating each of the pushers (20) about respective axes (B) disposed in a horizontal plane below and extending transversely to the path (18) toward the actuated position in a longitudinally propagating continuous wave behind the wheel (12) to smoothly roll the wheel (12) along the path (18).

70. A method as set forth in any one of claims 66, 67, 68 or 69 further characterized by supporting a wheel engaging edge (28) of each of the pushers (20) above the path (18) when in the rest position.

71. A method as set forth in claim 70 further characterized by extending each of the wheel engaging edges (28) transversely to the path (18).

72. A method as set forth in claim 71 further characterized by converting linear movement to arcuate movement for moving the pushers (20) from the rest to actuated positions.

* * * * *